United States Patent [19]

Crossman

[11] Patent Number: 4,506,950
[45] Date of Patent: Mar. 26, 1985

[54] VIEWING DEVICE

[76] Inventor: Richard B. Crossman, 2451 Second Ave. W., Seattle, Wash. 98119

[21] Appl. No.: 446,570

[22] Filed: Feb. 28, 1983

[51] Int. Cl.³ .................. G02B 27/02; G02F 11/02
[52] U.S. Cl. ................................. 350/238; 40/506; 350/241; 350/243
[58] Field of Search ................. 350/238–239, 350/241, 243; 353/11–14; 434/39–40; 272/18; 40/361–367, 495, 503, 506; 33/334; 343/450, 452; 352/69–71

[56] References Cited

U.S. PATENT DOCUMENTS

| 784,929 | 2/1911 | Kellner . | |
| 1,619,536 | 3/1927 | Parks et al. . | |
| 2,080,511 | 5/1937 | Sjostrand | 343/452 |
| 2,361,956 | 11/1944 | Moseley | 343/450 |
| 2,518,419 | 8/1950 | Dehmel | 353/12 |
| 2,600,644 | 6/1952 | Hand . | |
| 2,674,152 | 4/1954 | Wilkinson | 350/241 |
| 3,070,792 | 12/1962 | Neasham | 343/452 |
| 3,209,645 | 10/1965 | Guttmann | 353/12 |
| 3,218,910 | 11/1965 | Benson et al. | 40/473 |
| 3,384,436 | 5/1968 | Kunnel | 350/241 |
| 4,114,997 | 9/1978 | Lunetta | 353/11 |
| 4,139,949 | 2/1979 | Goldman | 33/348 |
| 4,198,635 | 4/1980 | Gell, Jr. | 343/452 |

FOREIGN PATENT DOCUMENTS 1953012 4/1971 Fed. Rep. of Germany ........ 352/69

Primary Examiner—William H. Punter
Attorney, Agent, or Firm—Keith D. Gehr

[57] ABSTRACT

The invention is a viewing device suitable as a novelty item or for such other purposes as a teaching or navigational aid. It comprises a compass and in its preferred form has a 360° panoramic photograph wrapped into drum form and affixed to the compass. A viewing device is also provided, so that when the person observing the photograph is facing a given compass direction, he will see essentially the same view that would be seen by another observer facing in the same compass direction at the point at which the photograph was taken. An essential part of the invention is the way the photograph is represented. If the viewing device is arranged to see the outside surface of the drum-shaped photograph, the photograph must be a mirror-image representation. If the viewing means is arranged to see the inside surface of the drum-shaped photograph, a normal representation must be used. In other versions of the invention, the photographs need not have edge-to-edge continuity. In any case, a person observing the photographs will see different representations as he or she faces in different compass directions.

7 Claims, 4 Drawing Figures

U.S. Patent   Mar. 26, 1985   Sheet 1 of 2   4,506,950
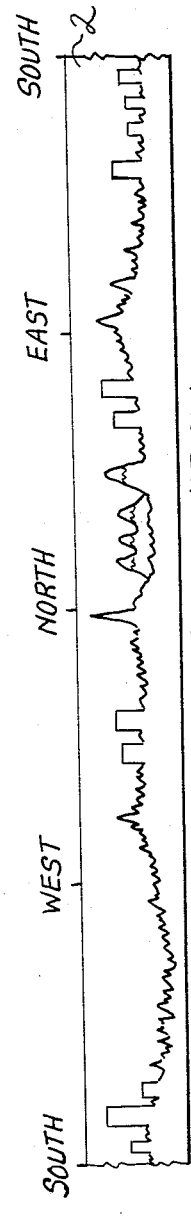
Fig. 1  TRUE IMAGE OF HORIZON
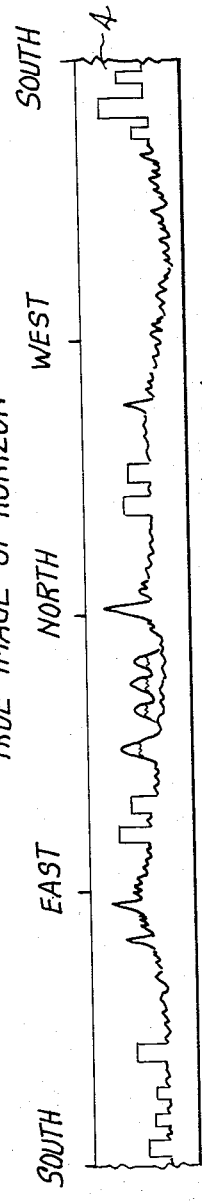
Fig. 2  MIRROR IMAGE OF HORIZON
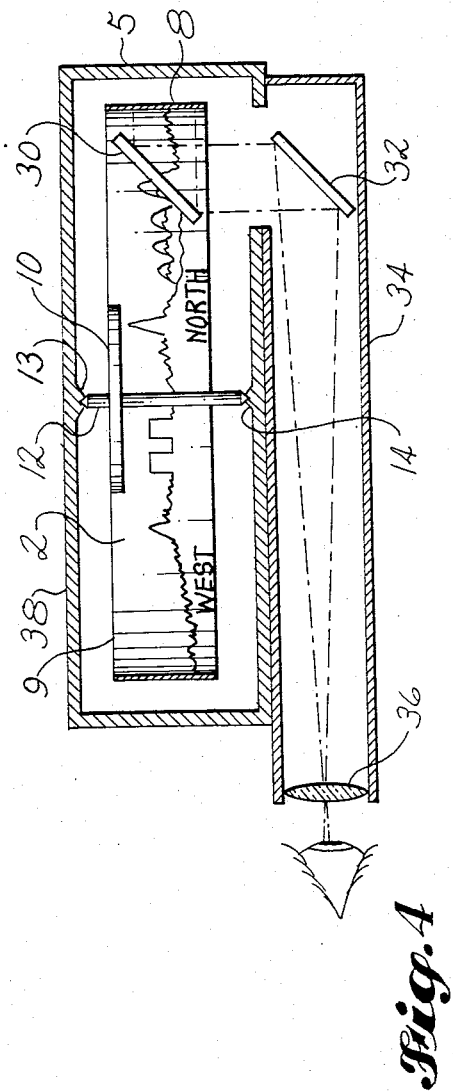
Fig. 4

VIEWING DEVICE

BACKGROUND OF THE INVENTION

The present invention is a device for viewing a panoramic photograph, or a group of individual photographs, in which the photograph or photographs are displayed on a drum-shaped surface attached to a magnetic pole-seeking compass. A person observing the photographs will see different representations as he or she faces in different compass directions.

Humans of all cultures are inveterate souvenir collectors. A large business has arisen in which photographs of scenically beautiful or historically interesting places are sold to travelers as remembrances of their visit. Very often these are provided as postcards, which can be mailed to friends or acquaintances. However, it is virtually impossible to adequately photograph a vista which encompasses a wide panorama. Even with the use of wide angle lenses, such a photograph will rarely be able to encompass a viewing angle as large as 60° without significant distortion. This is considerably less than the normal field of human vision. Photographs are particularly inadequate to record a panorama which may include the full 360° horizon surrounding the point of observation. To the present inventor's knowledge, the only way this has been attempted is through the use of panoramic photographs which are presented in planar form. Unfortunately, these fail to give the observer the feeling of being surrounded by the scene being viewed.

The present invention is a device which successfully overcomes the feeling of "flatness" when viewing a panoramic photograph. It has the further advantage that the observer sees the scene as it actually exists in terms of the cardinal directions or compass points. One device known to the present inventor with remote similarity is a navigational aid described in Lunetta, U.S. Pat. No. 4,114,997. This uses a series of shoreline charts on a microfiche card to enable a boater to determine his position and course. Other prior devices known to the inventor are only very remotely related. These include U.S. Pat. No. 984,929 to Kellner, which discloses a periscope system for remote observation of a compass. U.S. Pat. No. 1,619,536 to Parks et al. shows a modified compass adapted for use in an automobile, which indicates to the observer the direction in which he or she is driving. U.S. Pat. No. 2,600,644 to Hand shows an illumination system for a compass dial somewhat similar to one element of the present invention. Finally, U.S. Pat. No. 4,139,949 to Goldman shows a compass having a fiber optic output system.

SUMMARY OF THE INVENTION

The present invention comprises a viewing device which includes as one element a compass means, consisting of a bearing means and at least one magnet mounted in conjunction with the bearing so that the compass means is free to seek the magnetic pole. The compass means is mounted in a case, which further has a supporting means for the compass bearing. A further element is a panoramic photograph, or group of individual photographs, formed into a cylinder or drum attached to the compass means in a manner so that it is free to rotate with the compass. The vertical axis of the drum is coincident with the axis or rotation of the compass. A viewing means for the photograph is an additional element of the combination. The photograph is preferably arranged so that if it is displayed on the inside of the drum, it will be present as a normal representation of the scene being viewed. If displayed on the outside of the cylinder or drum, it is preferably a mirror-image representation. in a preferred version of the invention, the photograph is oriented on the compass means so that when it is viewed by an observer who is facing in a given compass direction, the observer will see essentially the same view as would be seen by another observer standing and facing in the same compass direction at the point at which the photograph was made.

The photograph or photographs displayed in the device may be either an opaque representation or a transparency and may be viewed with a suitable viewing device from either the inside or outside of the cylinder or drum. The viewing device will normally include a magnifying lens so that the observer will have a more life-like impression of the scene being viewed. The drum on which the photograph is displayed may be either illuminated naturally by ambient light or artificially. The photograph is preferably a continuous representation, as seen from the viewing point. It may also be a series of individual, smaller photographs mounted edge-to-edge, which, in essence, give the same effect or it may be a series of individual discontinuous photographs.

It is an object of the present invention to provide a viewing device which presents a naturalistic 360° view of a scene taken at a remote point.

It is a further object to provide a viewing device in which the image is seen by the viewer in its proper compass orientation.

It is another object to present a device useful as a novelty item or navigational aid, which can be manufactured inexpensively.

It is yet an object to provide a viewing device arranged so that an observer will see different photographic representations as he or she faces in different compass directions.

These and many other objects will be readily apparent to those skilled in the art upon reading the attached detailed description taken in conjunction with the drawings.

BRIEF DESCRIPTION OF THE DRAWINGS

FIG. 1 is a normal 360° panoramic view of a horizon shown as a flat image.

FIG. 2 is a mirror-image of the scene seen in FIG. 1.

FIG. 4 is a cross-sectional view of another version of the viewing device.

DETAILED DESCRIPTION OF THE PREFERRED EMBODIMENTS

Figure 3:
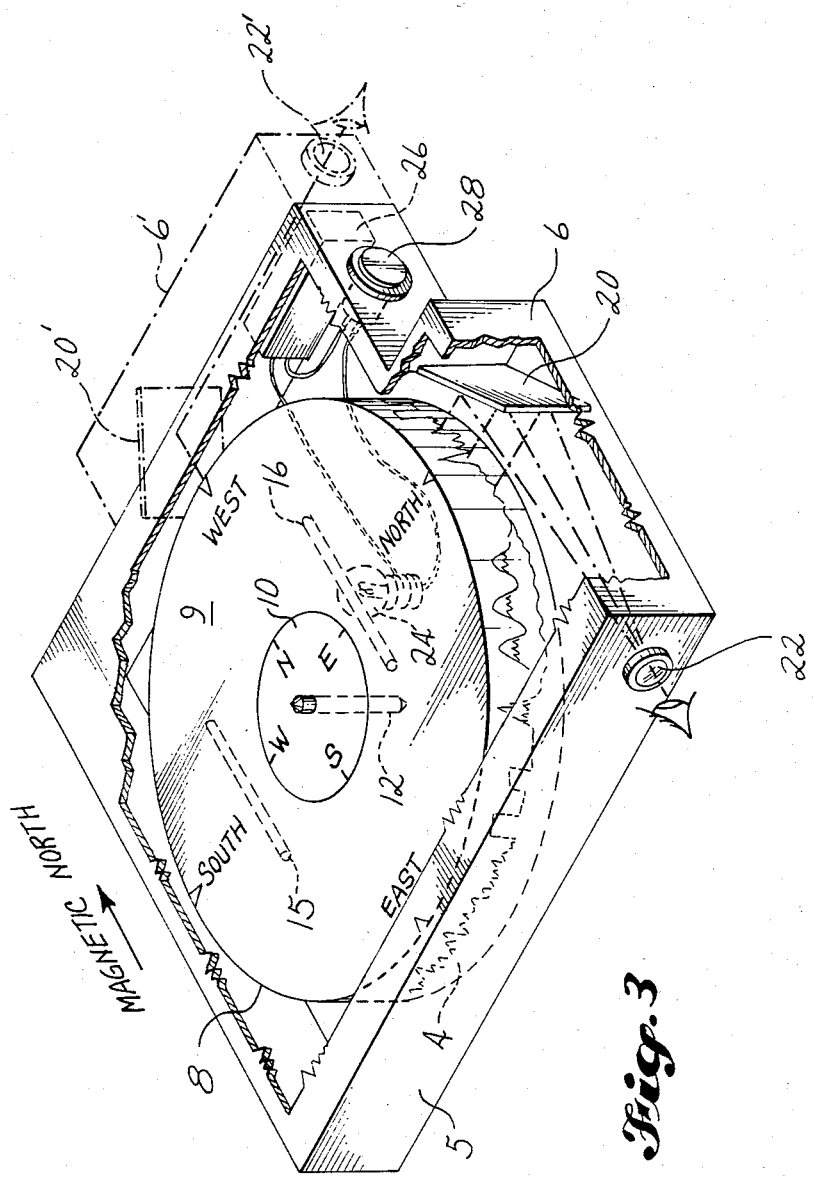
FIG. 3 is an isometric view, partially cut away, of one version of the viewing device.

The following description of the present invention is directed to an embodiment which might be manufactured and sold as a novelty item. It will be apparent that there are many other potential uses for the device of the invention. Among these might be visual navigational aids for boaters or aircraft pilots.

One version of the device is best seen in FIG. 3. It comprises a housing 5 with an offset portion 6 that contains the viewing system. This housing would normally be of a molded plastic material, such as polystyrene or acrylic. In many cases it is desirable for the housing to be molded from a colorless, transparent plastic so as to take advantage of natural illumination. Located inside the housing is a drum 8, which holds a mirror-image representation of a 360° photograph of the horizon 4 (as seen in FIG. 2) on its outside surface. The drum has a top portion 9, which is attached to a compass card 10. This drum may be a separate structure or it may be formed using the base material of the photograph as a supporting structure. The compass card is mounted on a pivotal bearing 12, which turns in seats 13,14, best seen in FIG. 4. Parallel bar magnets 15,16 are affixed to the upper portion 9 of the drum. Other magnetic means would, of course, be suitable for making an operative compass element. The compass element may be damped, if desired, by conventional means such as liquid or magnetic.

The viewing means comprises a mirror 20 and a magnifying lens 22. Note that the north view on the photograph is rotated 90° on the drum in order that the observer will be seeing the correct image representation when he or she is facing magnetic north. If the observer should rotate one-quarter turn counter-clockwise so that instead of facing north, he or she is facing to the west, the drum will remain in the same north-seeking compass orientation. The observer will thus see the same image as would another observer standing at the point of the photograph and facing in a westerly direction. This situation is indicated by the dashed lines in FIG. 3.

The photograph affixed to the top member 9 of the compass card may be either opaque or it may be a transparency. In the case of a transparency, the housing 5 might be made of a transparent, colorless material, as could the top 9 of the drum. Ambient light could then provide sufficient illumination so that an observer could see the image. An alternative construction which would be useful in poor light might employ a small electric lamp 24 powered by a battery 26 and operated by switch 28. This light would normally be affixed to the bottom portion of housing 5 so that it would always be in position to provide optimum lighting for the observer, remembering that it is the housing which rotates, rather than the drum, which always remains in a fixed north-seeking position.

An alternative form of the invention is seen in FIG. 4. Here a normal form of the image 2 is placed on the inside of drum 8. The viewing device comprises mirrors 30 and 32, and a viewing tube 34, now located on the bottom of case 5. Magnifying lens 36 is preferably used in order to enlarge the image. In the version shown, the upper portion 38 of case 5 is assumed to be transparent and colorless, as is the top portion 9 of drum 8 in order to take advantage of ambient illumination. It will be immediately evident that artificial illumination could be provided for this version of the device, in a similar manner to the one shown in FIG. 3.

It will be useful in understanding the invention to describe why normal or mirror-image photographs should be used in the various embodiments. It is relatively obvious that an observer will see a mirror-image if a normal photograph is viewed in a single mirror. What is not so obvious in the present apparatus is the fact that an east-to-west reversal can occur at the same time. For this reason, if the outside of the drum is being viewed, a mirror-image photograph should be used. If a normal image was represented on the outside of the drum, the problem of the observer seeing a mirror-image could be correct by the use of two viewing mirrors, using an arrangement as shown in FIG. 4. However, this is not the only problem, since on east-to-west reversal occurs as well. For this reason, if a panoramic scene is being viewed, it is essential for the image on the outside of the drum to be mirror-image, while a normal image must be used on the inside of the drum. The following table summarizes the possibilities. It is immediately evident that of all the possible combinations, the only ones which result in proper representation of the image require a normal image inside and a mirror-image on the outside of the drum.

| Side of Drum Viewed | Mirror Used for Viewing | View Seen When Facing East | East to West Horizon |
|---|---|---|---|
| Normal image presentation inside of drum and mirror image outside | | | |
| Inside | No | East | Normal |
| Outside | No | East | Reversed |
| Inside | Yes | East | Reversed |
| Outside | Yes | East | Normal |
| Mirror image presentation inside of drum and normal image outside | | | |
| Inside | No | West | Reversed |
| Outside | No | West | Normal |
| Inside | Yes | West | Normal |
| Outside | Yes | West | Reversed |

In one version of the device contemplated by the inventor, the picture mounted on the drum would be replaceable. In this case, a series of panoramas, taken from different locations along a line of travel, might be used in order to provide a navigational device. The device could also be used as a teaching aid.

In another version of the present invention, the photograph on the outside of the drum could be rotationally moveable, in case it was desired to correct for differences in compass declination between the observer's point and the point at which the photograph was taken.

While a preferred version of the invention utilizes a continuous representation of a horizon as viewed from a point in space, the invention is also considered to embody the opposite situation. In this case the viewer would be considered to be moving in a circle around a fixed object. An example might be a series of photographs taken from a plane flying around a scenic mountain. The invention is also considered to embody a series of photographs which would not have edge-to-edge continuity or would even be unrelated.

It will be apparent to those skilled in the art that many variations can be made without departing from the spirit of the present invention. It is the intension that the invention be limited only as defined in the following claims.

What is claimed is:

1. A viewing device which comprises:
   a. magnetic compass means comprising a bearing means and at least one magnet mounted in conjunction therewith so that the compass means is free to seek the magnetic pole;
   b. a case having supporting means for the compass means;
   c. a photograph formed into a drum attached to the compass means so that the vertical axis of the drum is coincident with the axis of rotation of the compass, said photograph being a mirror-image representation shown on the outside of the drum; and
   d. viewing means for the photograph, said means comprising a mirror and magnifying lens, so that a person observing the photograph and facing in a given compass direction will see essentially the same view that would be seen by an observer standing at the point at which the photograph was taken and facing the given compass direction.

2. The viewing device of claim 1 in which the photograph is a transparency presenting a mirror-image representation when viewed from the outside of the drum.

3. The viewing device of claim 2 in which the transparency is illuminated from inside the drum.

4. The viewing device of claim 3 further including a battery-powered lamp to provide illumination of the photograph.

5. The viewing device of claim 1 in which the photograph is a panoramic representation comprising a 360 view taken from a given point in space.

6. The viewing device of claim 5 in which the panoramic photograph is a continuous photograph.

7. The viewing device of claim 1 in which the panoramic photograph comprises a series of individual photographs.

* * * * *